(12) United States Patent
Tohara (10) Patent No.: US 7,837,583 B2
(45) Date of Patent: Nov. 23, 2010

(54) SILENT CHAIN

(75) Inventor: Takashi Tohara, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 48 days.

(21) Appl. No.: 12/143,098

(22) Filed: Jun. 20, 2008

(65) Prior Publication Data

US 2009/0042683 A1  Feb. 12, 2009

(30) Foreign Application Priority Data

Aug. 8, 2007  (JP) .............................. 2007-206077

(51) Int. Cl.
F16G 13/04 (2006.01)
F16G 5/00 (2006.01)
F16G 1/28 (2006.01)
F16G 5/20 (2006.01)
F16G 13/02 (2006.01)

(52) U.S. Cl. ................. 474/213; 474/201; 474/202; 474/206

(58) Field of Classification Search ................ 474/206, 474/212, 213, 140, 139, 229, 201
See application file for complete search history.

(56) References Cited

U.S. PATENT DOCUMENTS

| | | | | |
|---|---|---|---|---|
| 1,860,514 A * | 5/1932 | Stiansen | .................. | 474/213 |
| 1,956,942 A * | 5/1934 | Belcher et al. | .............. | 474/139 |
| 2,669,879 A * | 2/1954 | Pierce | .................. | 474/217 |
| 2,718,153 A * | 9/1955 | Dean | .................. | 474/140 |
| 3,656,361 A * | 4/1972 | Honda | .................. | 474/140 |
| 4,227,425 A * | 10/1980 | Bendall | .................. | 474/213 |
| 4,509,323 A * | 4/1985 | Ledvina et al. | .................. | 59/8 |
| 4,509,937 A * | 4/1985 | Ledvina et al. | .................. | 474/213 |
| 4,547,182 A * | 10/1985 | Rattunde | .................. | 474/214 |
| 4,758,209 A * | 7/1988 | Ledvina | .................. | 474/156 |
| 4,832,668 A * | 5/1989 | Ledvina et al. | .................. | 474/155 |
| 5,334,111 A * | 8/1994 | Cole et al. | .................. | 474/214 |
| 5,423,724 A * | 6/1995 | Cole et al. | .................. | 474/229 |
| 5,758,484 A * | 6/1998 | Ledvina et al. | .................. | 59/5 |
| 5,967,926 A * | 10/1999 | Kozakura et al. | .................. | 474/213 |
| 5,989,140 A * | 11/1999 | Ichikawa et al. | .................. | 474/148 |
| 6,142,902 A * | 11/2000 | Ichikawa et al. | .................. | 474/212 |
| 6,171,209 B1 * | 1/2001 | Matsuda | .................. | 474/213 |
| 6,220,981 B1 * | 4/2001 | Yoshida | .................. | 474/111 |
| 6,334,829 B1 * | 1/2002 | Saito et al. | .................. | 474/213 |
| 6,364,800 B1 * | 4/2002 | Avramidis et al. | .................. | 474/213 |
| 6,383,105 B1 * | 5/2002 | Matsuno et al. | .................. | 474/213 |
| 6,406,396 B1 * | 6/2002 | Turner | .................. | 474/242 |
| 6,419,604 B2 * | 7/2002 | Saito et al. | .................. | 474/213 |
| 6,440,022 B1 * | 8/2002 | Ichikawa et al. | .................. | 474/213 |
| 6,447,225 B1 * | 9/2002 | Green | .................. | 409/231 |
| 6,478,704 B1 * | 11/2002 | Greiter | .................. | 474/229 |
| 6,575,861 B2 * | 6/2003 | Markley et al. | .................. | 474/156 |
| 6,733,410 B2 * | 5/2004 | Saito | .................. | 474/212 |

(Continued)

FOREIGN PATENT DOCUMENTS

JP  3122072  7/1999

*Primary Examiner*—Michael R Mansen
*Assistant Examiner*—Henry Liu
(74) *Attorney, Agent, or Firm*—Howson & Howson LLP (57) ABSTRACT

In a silent chain, link plates having two different back heights are arranged so that V-shaped oil guiding walls, opening in the direction of chain travel, are formed on the back of the chain that comes into sliding contact with the shoe of a chain guide.

16 Claims, 11 Drawing Sheets

U.S. PATENT DOCUMENTS

| | | | |
|---|---|---|---|
| 6,805,646 B2* | 10/2004 | Kozakura et al. | 474/213 |
| 7,229,375 B2* | 6/2007 | Hummel et al. | 474/213 |
| 7,419,449 B2* | 9/2008 | Tohara et al. | 474/213 |
| 7,476,170 B2* | 1/2009 | Ogo et al. | 474/212 |
| 7,585,239 B2* | 9/2009 | Miyazawa | 474/157 |
| 2002/0013191 A1* | 1/2002 | Saito et al. | 474/213 |
| 2002/0025870 A1* | 2/2002 | Kozakura et al. | 474/214 |
| 2005/0277507 A1* | 12/2005 | Ogo et al. | 474/206 |
| 2007/0111835 A1* | 5/2007 | Ogo et al. | 474/213 |
| 2007/0161445 A1* | 7/2007 | Nagao et al. | 474/212 |
| 2008/0300079 A1* | 12/2008 | Botez et al. | 474/213 |

* cited by examiner

SILENT CHAIN

CROSS-REFERENCE TO RELATED APPLICATION

This application claims priority on the basis of Japanese patent application 2007-206077, filed Aug. 8, 2007. The disclosure of Japanese application 2007-206077 is incorporated by reference.

FIELD OF THE INVENTION

This invention relates to silent chains for use in a power transmission mechanisms in automobiles, industrial machines, conveying mechanisms and the like, and more specifically to improvements in silent chains which suppress sliding contact wear between the chain and a chain guide. It is known to construct a silent chain having interleaved link plates arranged in alternate joint rows and guide rows, with the outermost plates in the guide rows being so-called "guide plates," which have no teeth, but serve to maintain the chain in alignment with the sprockets with which they are engaged. In such silent chains, it is known to form the guide row plates with flat back surfaces which are substantially co-planar in a portion of the chain stretched in a straight line, and to form the joint row plates with slightly lower back surfaces. It is also known to form the joint row plates with back surfaces which are coplanar in a portion of the chain that is stretched, and higher than the back surfaces of the guide row plates. An example of such a chain is described in Japanese Patent No. 3122072.

The conventional silent chain as described in Japanese Patent No. 3122072 exhibits decreased frictional resistance when in sliding engagement with a chain guide, since the surface area of the back of the chain, which comes into sliding contact with the shoe of a chain guide, is reduced. However, when the area of contact between the chain and the shoe is decreased, the contact pressure is increased, and consequently contact wear is accelerated, and the endurance of the chain is remarkably decreased.

Accordingly, an object of this invention is to address and solve the above-described problems and to provide a silent chain which smoothly travels in sliding contact with a chain guide with reduced friction but with superior excellent resistance to wear.

SUMMARY OF THE INVENTION

The silent chain according to the invention comprises widthwise rows of link plates interleaved with one another and connected articulably by connecting pins to form an endless loop. The link plates have teeth protruding toward the inside of the loop for engagement with sprocket teeth. The chain has an outwardly facing side capable of sliding contact with a chain guide, and the link plates have back surfaces facing toward the outside of the loop. The link plates of the chain comprise first and second sets. The backs of the plates of the first set protrude toward the outside of the loop farther than the backs of the link plates of the second set, and the plates are arranged to form a repeating series of V-shaped oil guide walls on the outwardly facing side of the chain, the V-shaped guide walls define V-shaped, oil-retaining recesses on the outwardly facing side of the chain, each recess having open ends on opposite sides of the chain.

Preferably, the V-shaped guide walls are repeated at regular intervals, each interval being a integral multiple of the chain pitch, i.e., an integral multiple of the center-to center distance of successive connecting pins.

The backs of the plates of the first set can be flat. However, in one preferred embodiment of the chain, the backs of the plates of the first set are in the form of convex arcs bulging toward the outside of the loop.

The oblique parts of the V-shaped oil-retaining recesses preferably extend obliquely forward in the direction of travel of the chain. Thus, according to one aspect of the invention, the chain is incorporated into a silent chain transmission and arranged to move in a circulating path in a traveling direction, and each of said V-shaped oil-retaining recesses comprises two parts extending obliquely forward in the direction of travel of the chain from an apex at an intermediate location between said opposite sides of the chain.

The V-shaped walls formed on the back of the chain cause lubricating oil present in the vicinity of the chain to flow inward toward the apex of the V-shaped grooves, thereby increasing the quantity of lubricating oil between the back of the chain and a chain guide on which the back of the chain slides. Thus, friction between the chain guide and the back of the chain is reduced, smooth travel of the chain while in sliding contact with the chain guide can be attained, and superior wear resistance can be achieved.

When the back surfaces of the link plates having higher backs are arc-shaped, the area of contact between the chain guide and the back of the chain is significantly reduced. Thus, smoother travel of the chain while in sliding contact with the chain guide can be attained, and friction can be significantly reduced. Moreover, the arc shape more effectively catches lubricating oil between the sliding contact surfaces of the chain guide and the chain, and thereby achieves still further improvements in wear resistance.

DETAILED DESCRIPTION OF THE PREFERRED EMBODIMENTS

The silent chain according to the invention is preferably a chain designed for initial engagement of the inner flanks of the link plate teeth with sprocket teeth, and for seating by engagement of the outer flanks of the link plate teeth with sprocket teeth, because this design achieves superior engagement noise reduction. However, other forms of silent chain design, such as the inner flank engagement-inner flank seating design, or the outer flank engagement-outer flank seating design, can be utilized.

In the silent chain of the invention the back surfaces of the link plates having higher backs can formed by various processes. Preferably, however, the higher backs are press-punched and shaved, press-punched and blanked, because these processes achieve significantly reduced sliding contact resistance between the chain and a chain guide, and therefore provide for smooth sliding contact and superior wear resistance.

In the chain, the backs of the link plates having higher backs form a series of V-shaped oil guide walls which define V-shaped oil retaining grooves that extend from one side of the chain obliquely toward an apex at an intermediate location between the sides of the chain and then obliquely toward the opposite side of the chain. The apex of each groove is located rearward from the openings of the grooves with reference to the direction of chain travel. Thus, the grooves are open toward the traveling direction of the chain. The term "V-shaped," as used herein should be understood as including any of various shapes that extend obliquely rearward from a first location on one side of the chain toward an apex at a location longitudinally spaced from the first location, and from the apex obliquely forward toward a second location on the opposite side of the chain. The oblique parts of the groove need not be straight or symmetrical. Thus, the term "V-shaped" should be understood as including an arc shape or a shape having a blunt apex. As will be seen, the shape of the oil guide walls and grooves is determined by the relative lengthwise shift in the arrangement of adjacent high-backed link plates. Thus, two adjacent high-backed link plates can be relatively shifted by a single pitch distance in a first lengthwise direction, or by a single pitch distance in the opposite lengthwise direction. It is also possible for two high backed link plates to be arranged side-by-side, i.e., without a lengthwise shift. Thus, the V-shape can be an acute or relatively gradual shape, or a shape corresponding to a C-shape.

The intervals of the V-shaped oil guide walls should be an integral multiple of the chain pitch, preferably four times, or six times, the chain pitch. Thus, in a given lengthwise column of link plates, the link plates having high backs can be spaced from each other by a single link plate having a low back, in which case the high back link plates are disposed at intervals corresponding to four times the chain pitch, or two successive link plates having low backs, in which case the high back link plates are disposed at intervals corresponding to six times the chain pitch Still greater intervals can be adopted, for example an interval in which, three, four, or more successive link plates having low backs are disposed in a lengthwise column between high back link plates. The intervals between V-shaped guide walls, are preferably regular, but the guide walls in a chain can also be disposed at several different intervals, which can be arranged either regularly or randomly.

The connecting pins used in the silent chain of the invention can be any of various types of connecting pins, including round pins and rocker joint pins.

Figure 1:
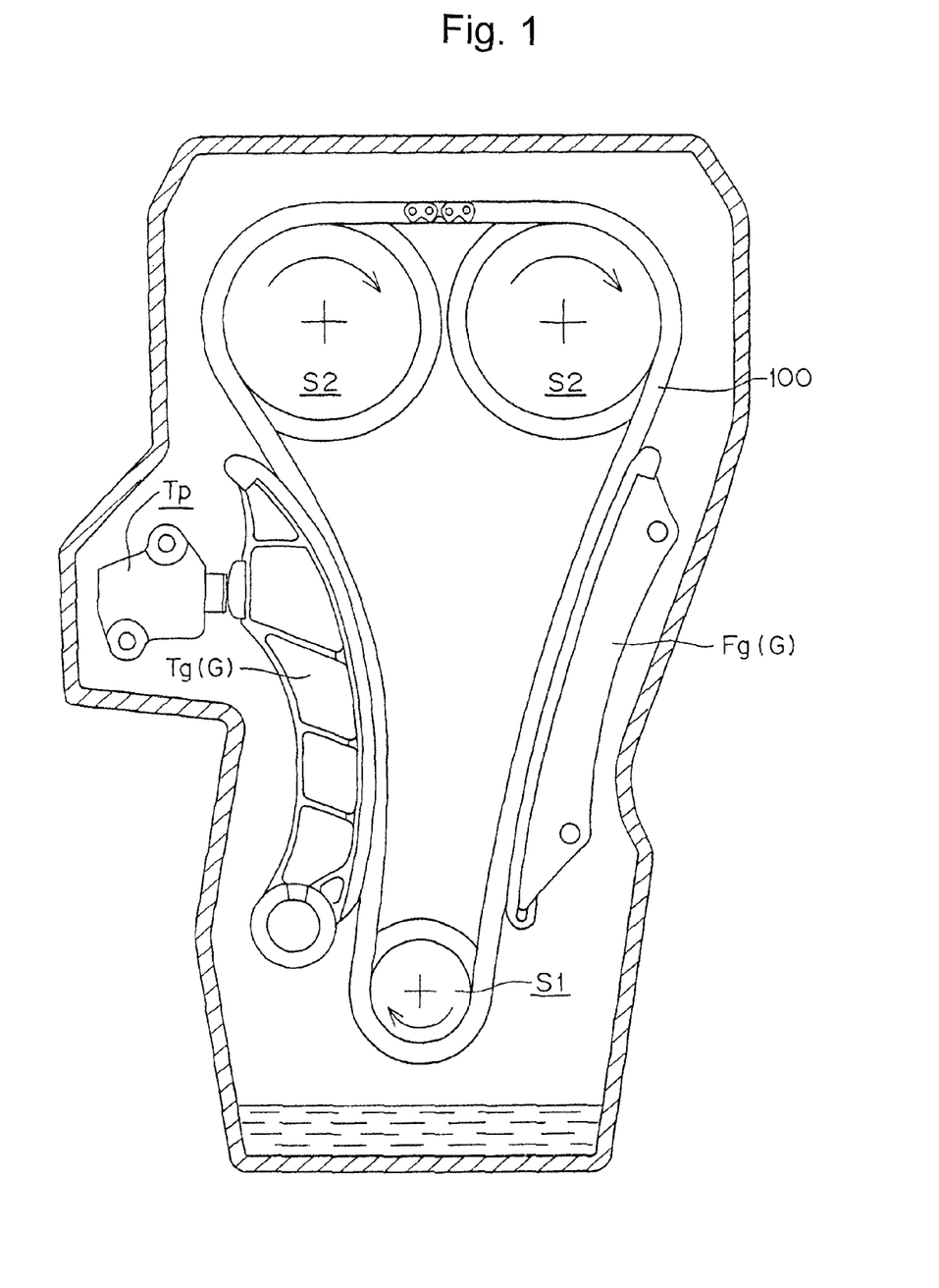
FIG. 1 is a schematic elevational view of an engine timing transmission typical of the kind of transmission into which the silent chain according to the invention can be incorporated.
Figure 2:
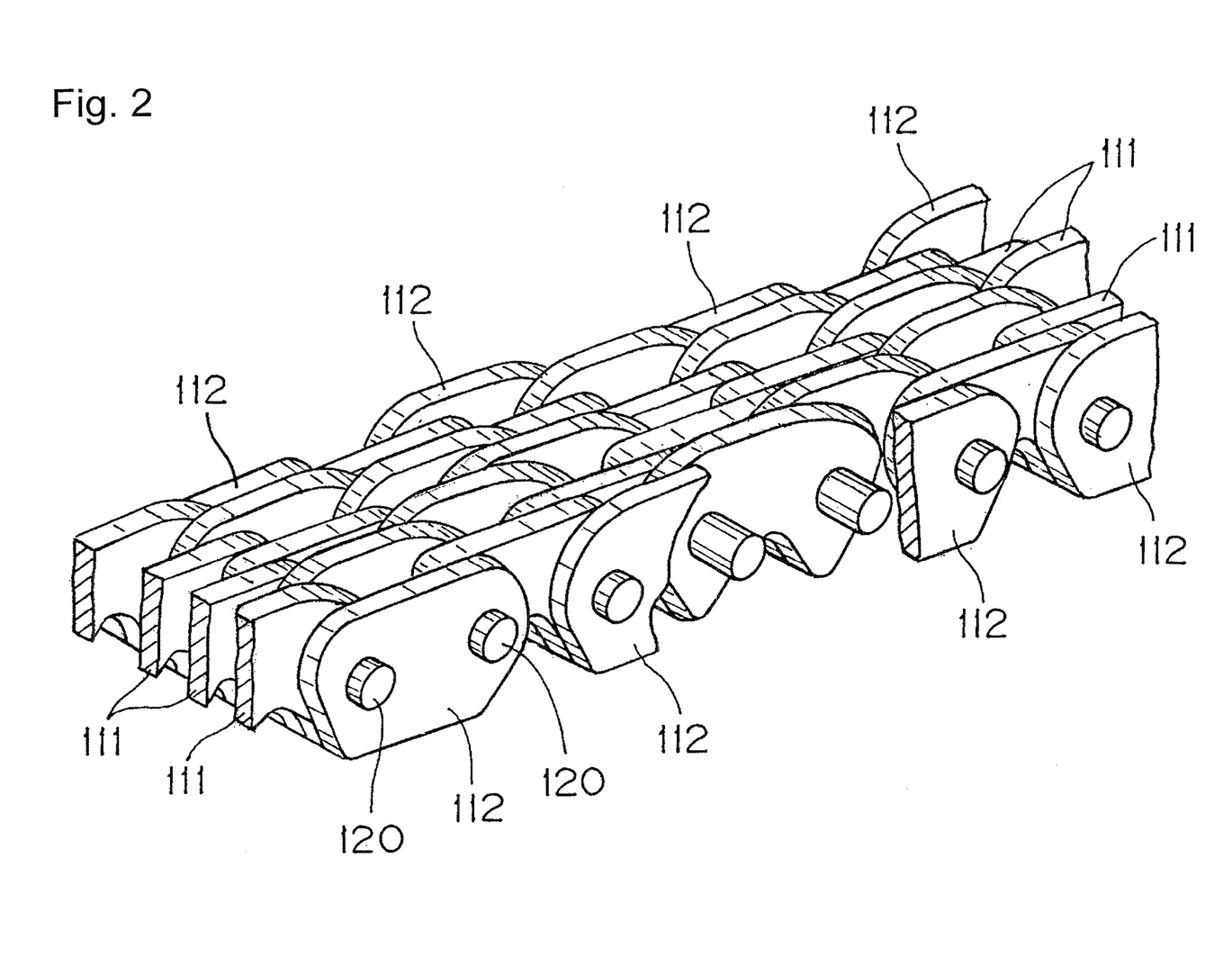
FIG. 2 is an enlarged perspective view of a portion of a silent chain according to a first embodiment of the invention.

The silent chain 100 according to the invention can be used in the timing system in an automobile engine as shown in FIG. 1. As shown in FIG. 2, the chain is formed of inner plates 111 and guide plates 112 connected in interleaved widthwise rows by round connecting pins 120.

Figure 4:
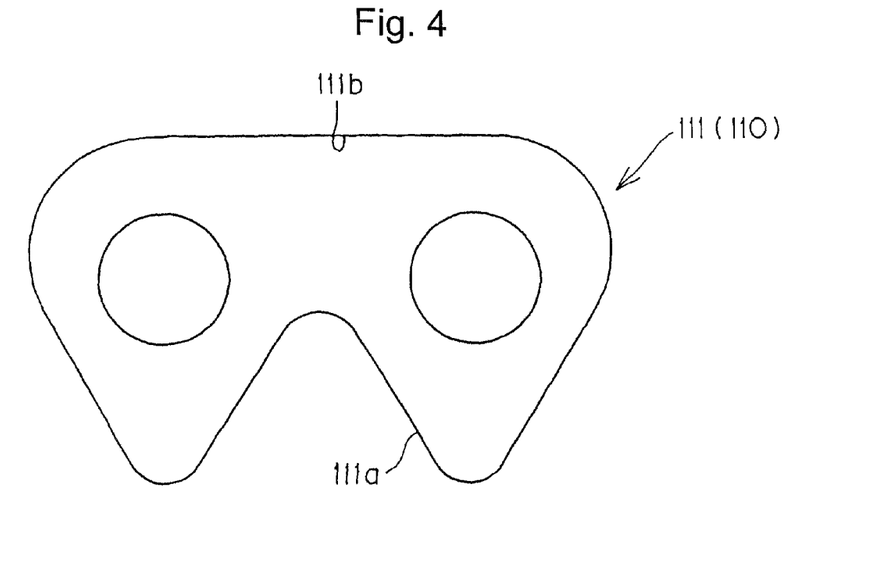
FIG. 4 is an elevational view of a link plate having a low back height in the silent chain of FIG. 2.
Figure 5:
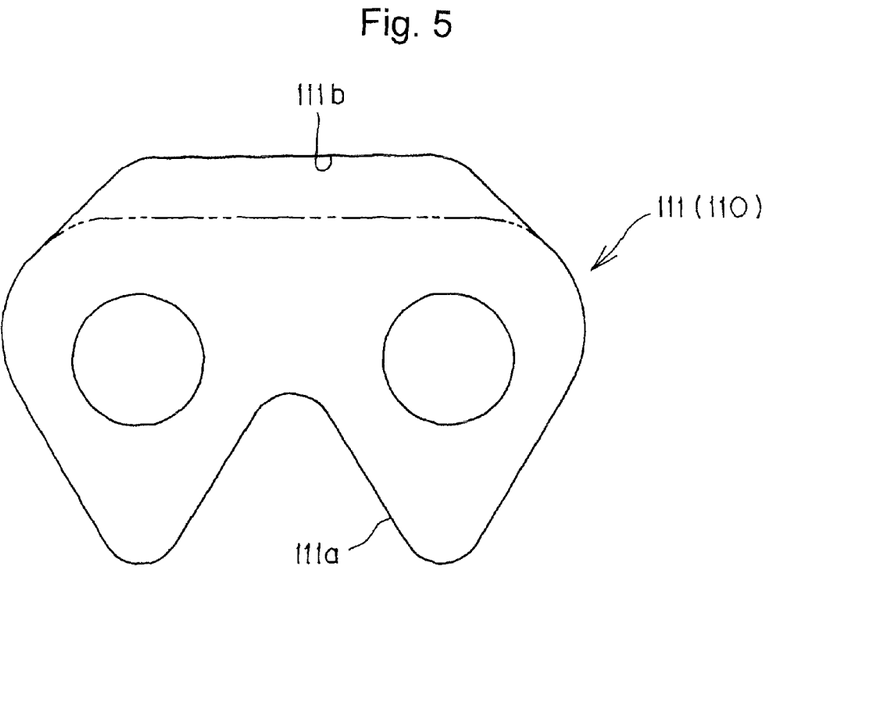
FIG. 5 is an elevational view of a link plate having a high back height in the silent chain of FIG. 2.

Teeth 111a the inner link plate 111, shown in FIGS. 4 and 5, engages with a driving crankshaft sprocket S1 and driven camshaft sprockets S2, as shown in FIG. 1 on the inside of the endless loop formed by the chain. The back of the chain is formed of flat back surfaces 111b (FIGS. 4 and 5) of the link plates and flat back surfaces 112b of the guide plates 112. Some of these back surfaces are higher than others, the height being the distance of the back surfaces from a plane defined by the axes of the connecting pins. The higher back surfaces come into sliding contact with chain guides G on the outside of the loop as shown in FIG. 1.

At least the high back surfaces are preferably formed by press punching followed by shaving to minimize sliding contact resistance The chain guides G include a pivoted guide Tg, which cooperates with a tensioner Tp to control chain tension in the side of the chain that travels from the driving sprocket S1 to one of driven sprockets S2, and a fixed guide Fg, on which the portion of the chain traveling from the other driven sprocket S2 to the driving sprocket S1 slides. The chain 100 is preferably an inner flank engagement-outer flank seating chain for minimization of engagement noise.

Figure 3:
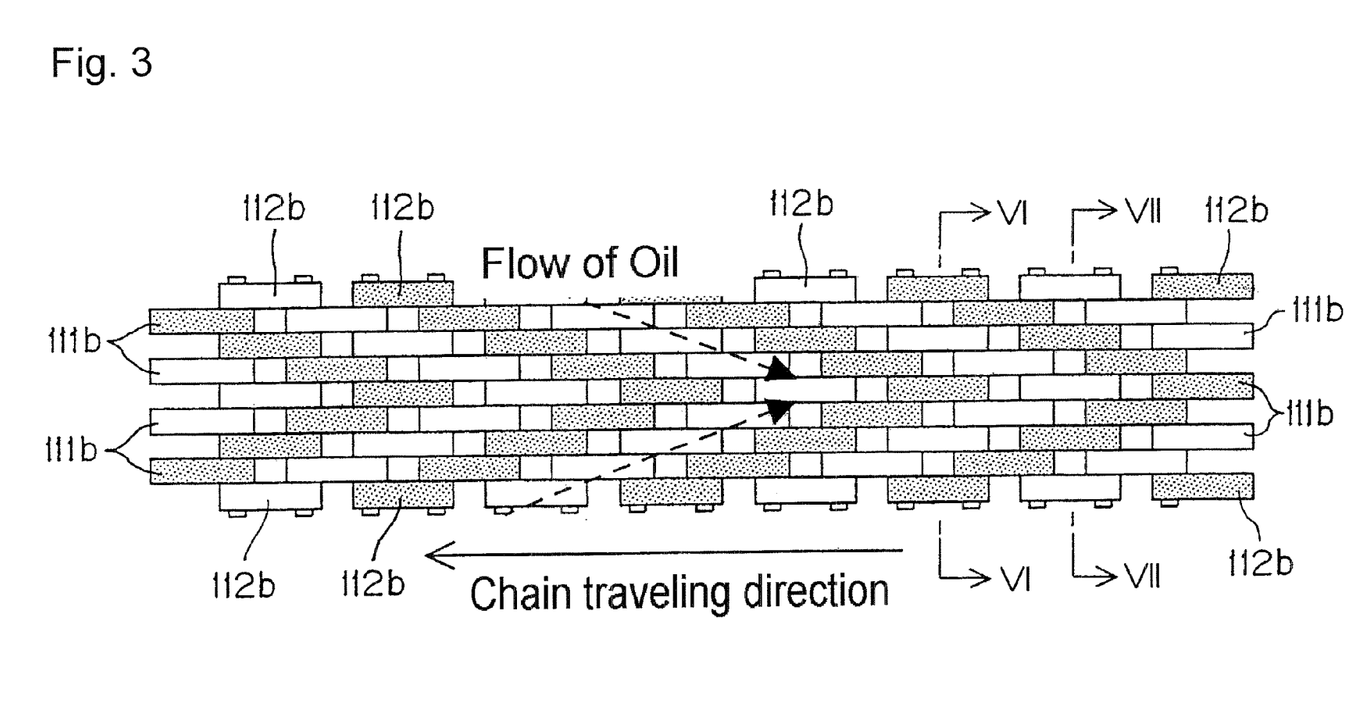
FIG. 3 is a schematic plan view showing the arrangement of link plates in the silent chain of FIG. 2.

V-shaped oil guide walls are formed on the back of the chain as shown in FIG. 3. The V-shaped oil guide walls are formed by the use of two kinds of link plates whose heights, measured from the connecting pins 120 (FIG. 2) to the back surfaces 111b of the link plates are different from each other, as shown in FIGS. 4 and 5. The V-shaped oil guide walls are formed arranging link plates having high back surfaces (as shown in FIG. 5) in a V-shaped arrangement with two parts both extending obliquely forward to the sides of the chain from an apex at an intermediate location between the sides of the chain. As shown in FIG. 3, where the high backs are shaded, adjacent plates having high backs are shifted relative to each other by a distance corresponding to the chain pitch, i.e., by a distance corresponding to the distance between the center lines of successive connecting pins in the chain. In the chain shown in FIG. 3, the V-shaped oil guiding walls are disposed at uniform intervals, with each high-backed plate in a longitudinal column in the chain separated from a next high-backed plate by a single, low-backed plate.

Further, as shown in FIGS. 2 and 3, along the sides of the chain, every second guide plate 112 has a high back. Thus, there are two kinds of guide plates in the chain, and the high-backed guide plates form parts of the oil-guiding walls.

Arrows in FIG. 3 denote the direction of flow of lubricating oil relative to the chain, which moves in a chain traveling direction also designated by an arrow. In FIG. 5, a broken line shows the position of the back of a low-back plate relative to the back of a high-back plate.

Figure 6:
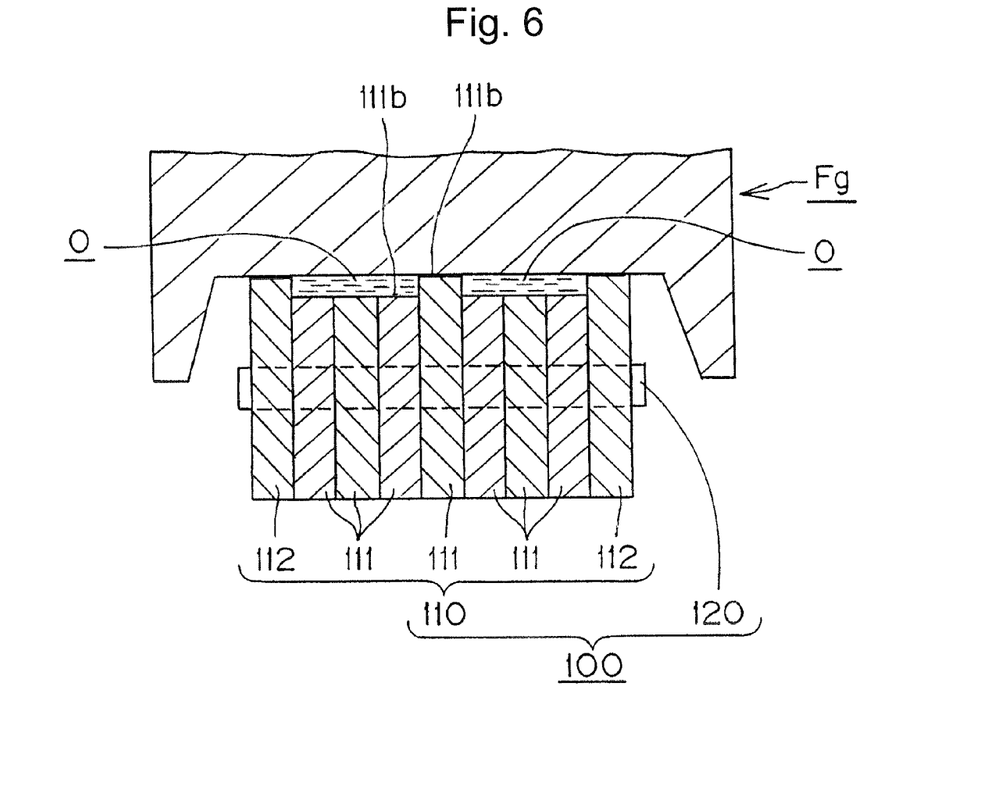
FIG. 6 is a cross-sectional view taken on plane VI-VI in FIG. 3, showing the chain traveling in sliding contact with a chain guide.
Figure 7:
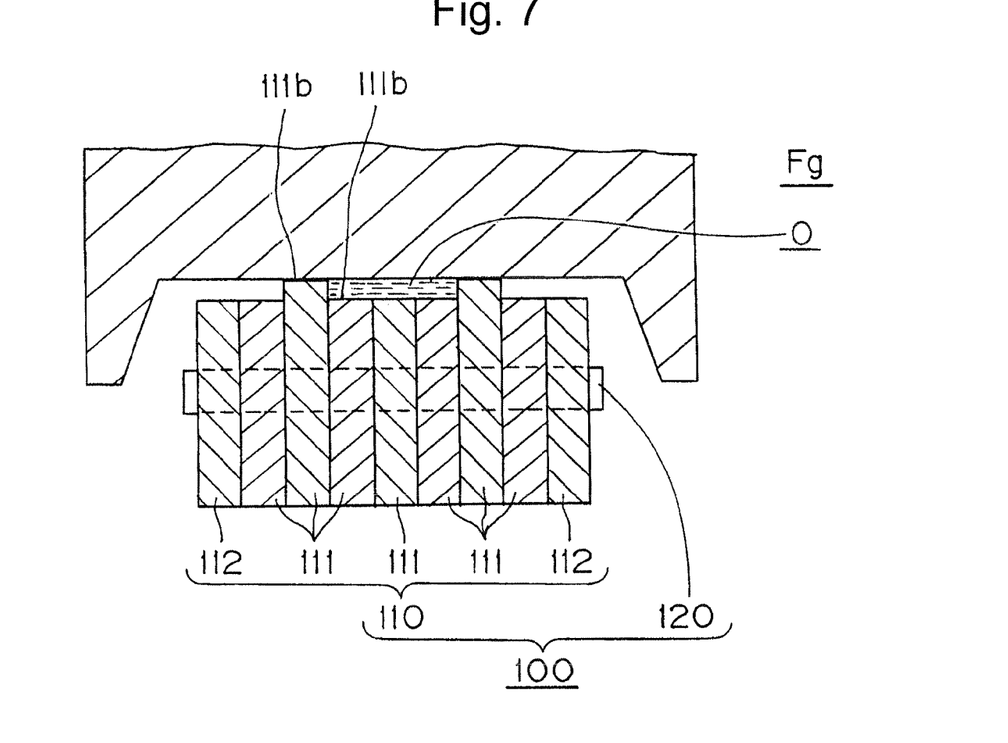
FIG. 7 is a cross-sectional view taken on plane VII-VII in FIG. 3, showing the chain traveling in sliding contact with a chain guide.

FIGS. 6 and 7 show the silent chain 100 traveling in sliding contact with a chain guide Fg. The V-shaped walls on the back of the chain guide lubricating oil O into V-shaped grooves formed between successive V-shaped walls to ensure that an adequate amount of lubricating oil is in contact with the surface of the chain guide with which the chain is in sliding contact.

Figure 8:
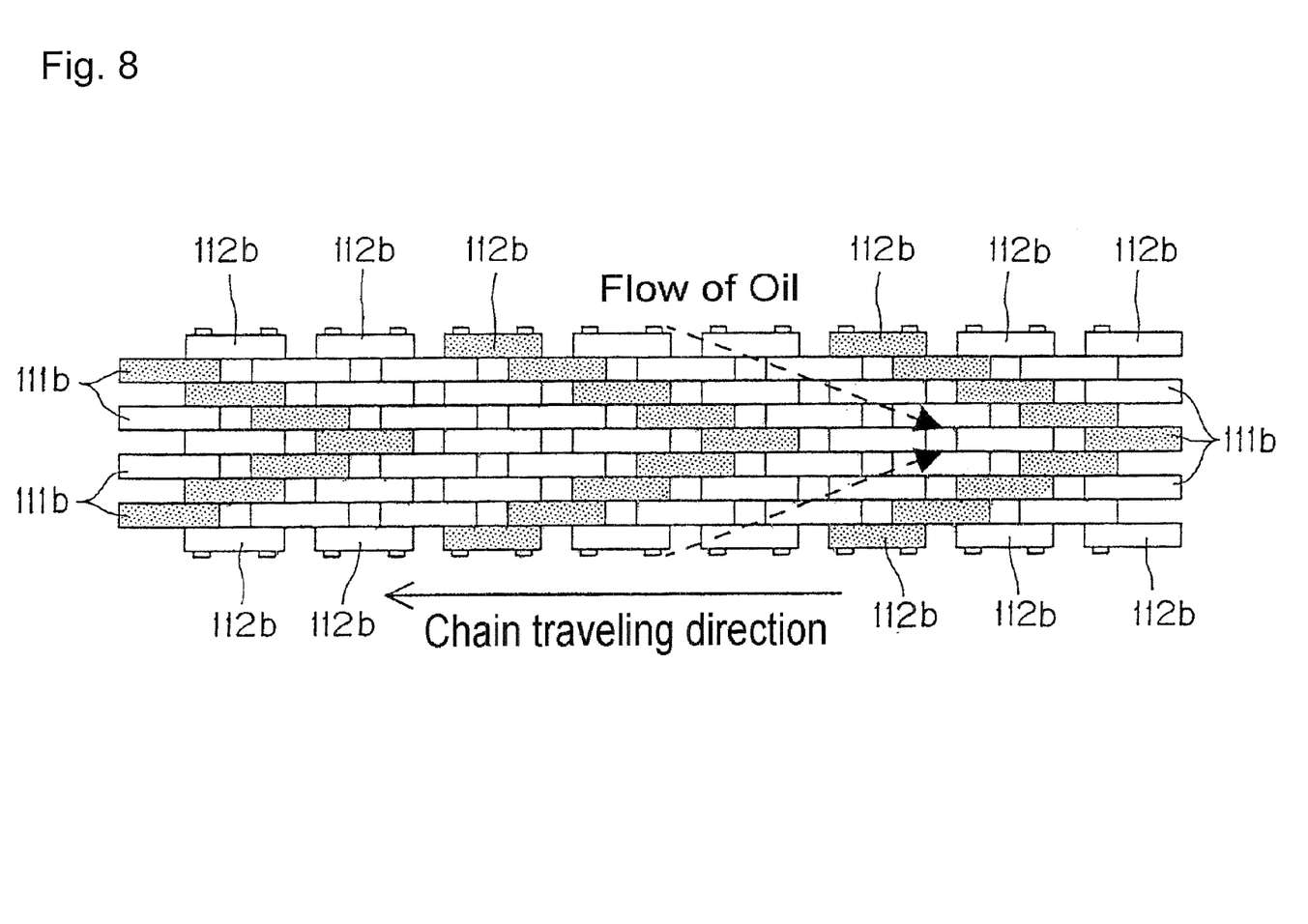
FIG. 8 is a schematic plan view showing the arrangement of link plates in a silent chain according to a second embodiment of the invention.
Figure 9:
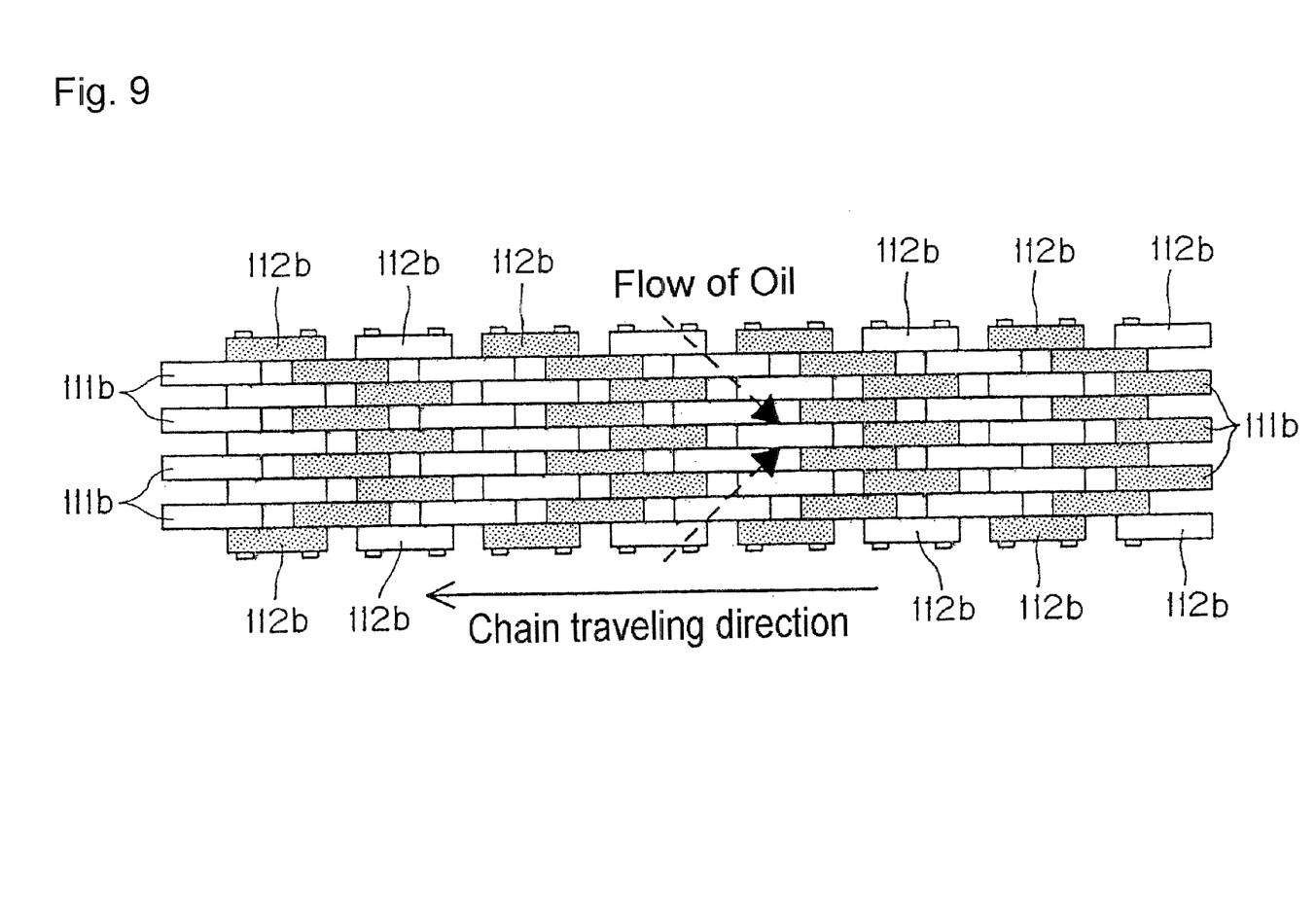
FIG. 9 is a schematic plan view showing the arrangement of link plates in the silent according to a third embodiment of the invention.

Alternative link plate arrangements, such as those shown in FIGS. 8 and 9, can be adopted as alternatives to the arrangement shown in FIG. 3. As in FIG. 3, arrows in FIGS. 8 and 9 shown the flow of lubricating oil relative to the chain as the chain travels in sliding contact with a chain guide.

In FIG. 8, the V-shaped oil guiding walls are disposed at intervals corresponding to six times the chain pitch, and high-backed link plates in a column are separated from one another by two low-backed link plates. Thus, the V-shaped grooves formed by the V-shaped oil guiding walls are wider than the corresponding grooves in the chain of FIG. 3. In the chain of FIG. 9, the walls are formed by inner link plates that are longitudinally shifted relative to one another in an alternating arrangement, and guide plates that are shifted forward relative to the adjacent inner link plates, thereby forming more gradual V-shaped grooves In the silent chains shown in FIGS. 3, 8, and 9, V-shaped oil guide walls form V-shaped grooves, each extending across the entire width of the chain, and opening on both sides of the chain toward the direction of chain travel. Lubricating oil present near the path of travel of the chain is guided by the V-shaped walls into V-shaped spaces formed between the chain guides and the back of the chain. Thus, friction between the chain guides and the back surface of the chain is reduced, so that smooth travel of the chain while in sliding contact with the chain guide is ensured, and superior wear resistance is realized.

FIGS. 10 to 13 depict another embodiment of the invention, which is similar to the embodiment of FIGS. 2-5, except for the shape of the backs of the high-backed link plates. Since the basic structure in FIGS. 10-13 is substantially the same as that in FIGS. 2-5, the reference numerals for corresponding parts in FIGS. 10-13 exceed by 100, the reference numeral in FIGS. 2-5.

Figure 10:
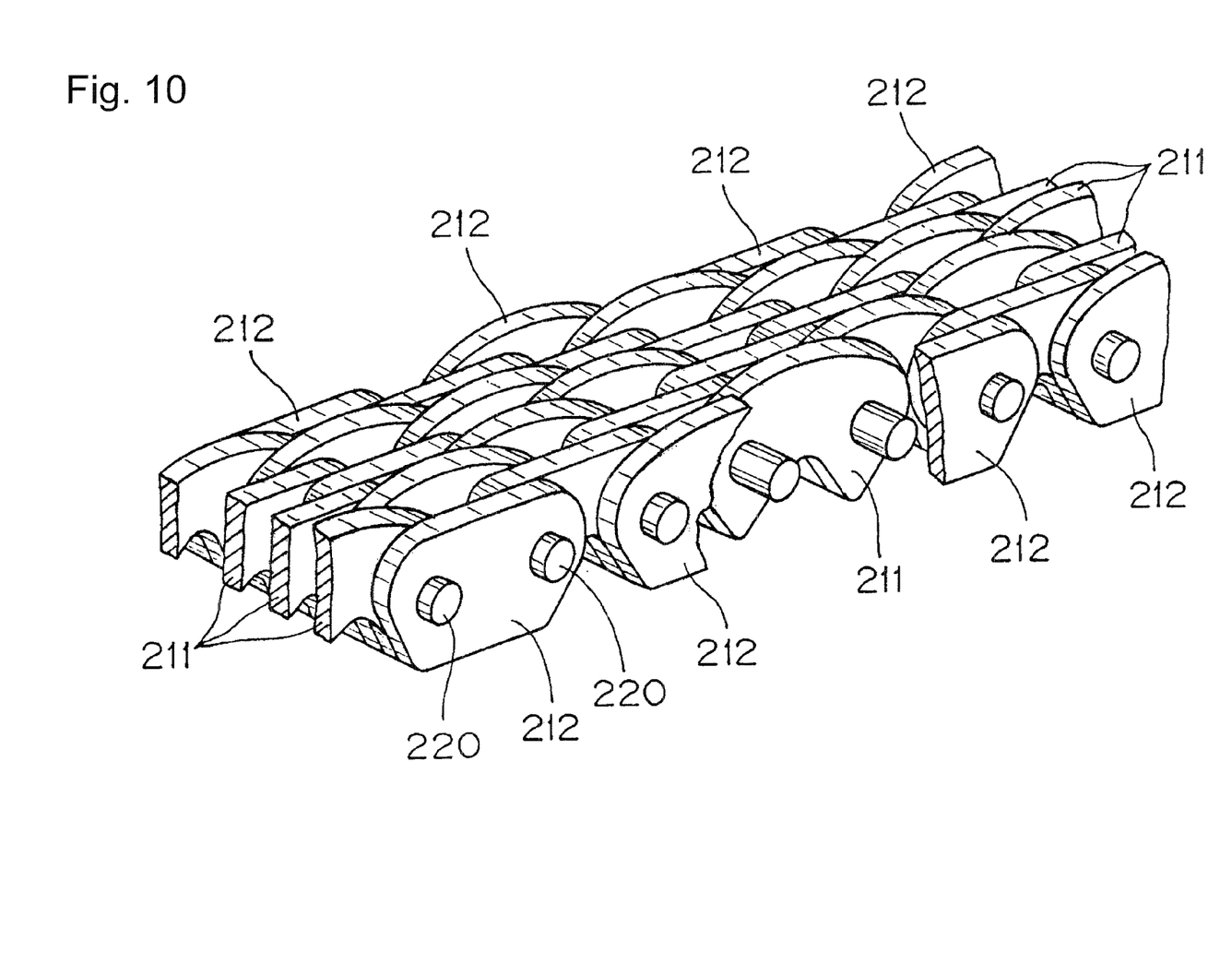
FIG. 10 is a perspective view of a part of a silent chain according to the invention in which the link plates having a high back height have rounded backs.
Figure 11:
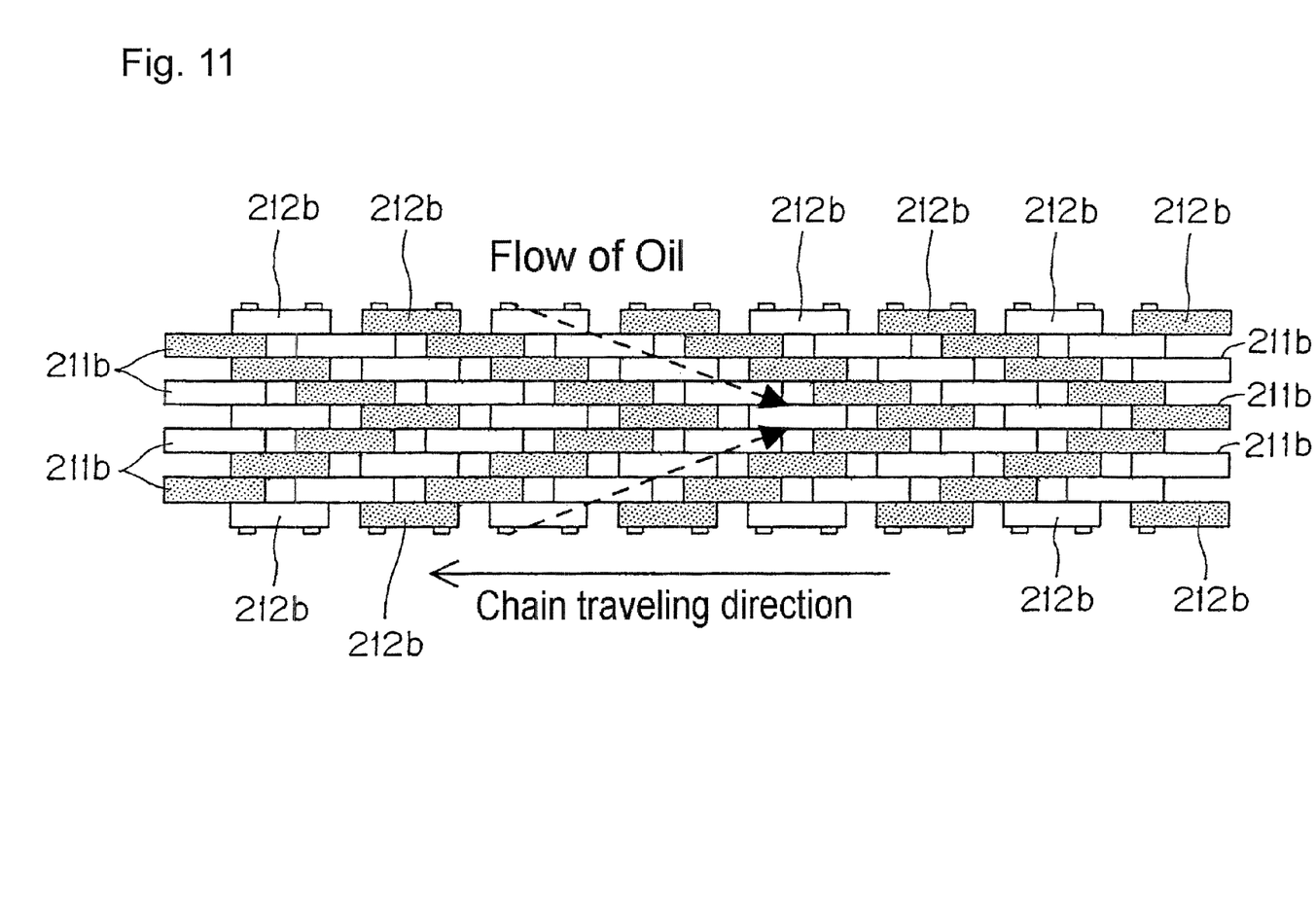
FIG. 11 is a schematic plan view showing an arrangement of link plates in the silent chain of FIG. 10.
Figure 12:
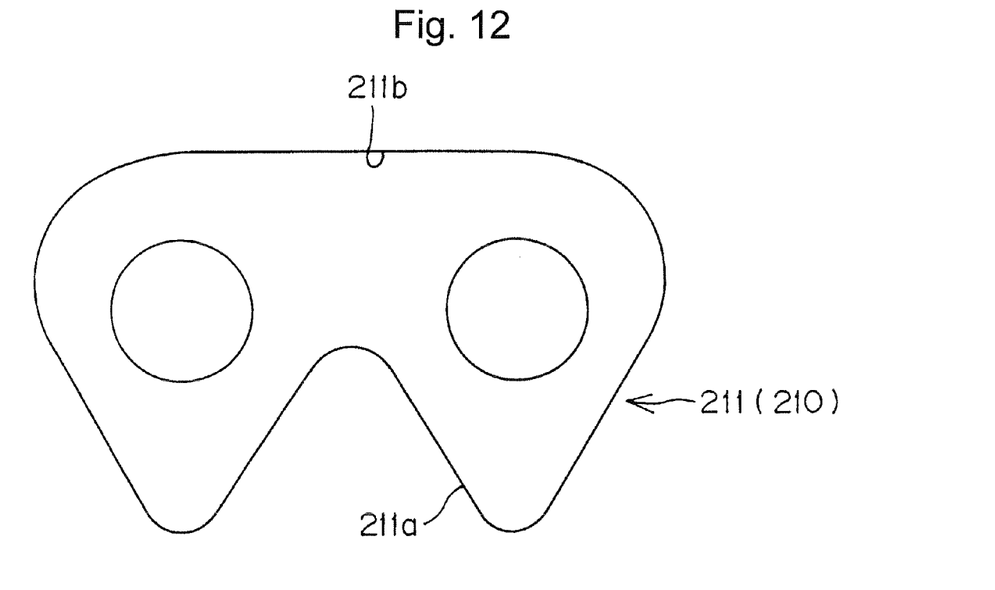
FIG. 12 is an elevational view of a link plate having a low back height in the silent chain of FIG. 10.

In the silent chain 200, which is the second example of the invention, a number of link plates composed of inner plates 211 and guide plates 212 are connected by round connecting pins 220.

The V-shaped oil guide walls in the silent chain 200 are provided on the back of the chain at intervals such that each high-backed plate of a V-shaped oil guide wall is separated from a corresponding plate in a next V-shaped oil guide wall by a plate having a low back.

Figure 13:
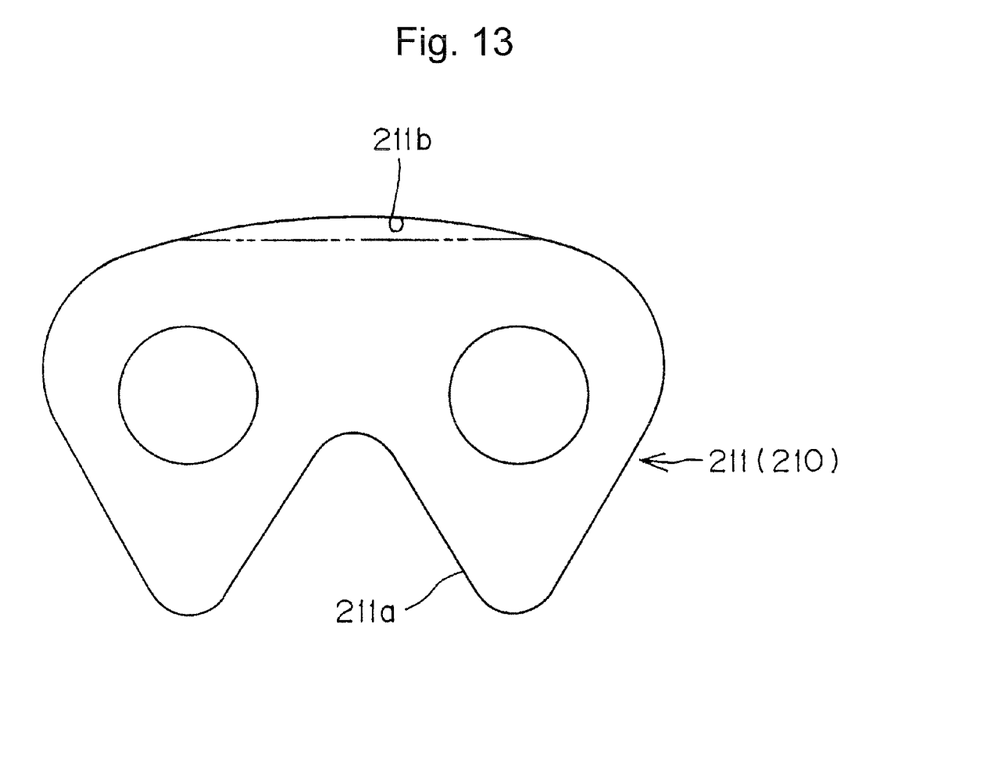
FIG. 13 is an elevational view of a link plate having a high back height in the silent chain of FIG. 10.

The difference between the chain of FIGS. 10 and 11 and the chain of FIGS. 2 and 3 is that the high-backed link plates have convex, arc-shaped, backs as shown in FIG. 13. These convex backs protrude beyond the flat backs of the other link plates. the relationship between the convex protruding backs and the flat backs is illustrated by the broken line in FIG. 13, which corresponds to the position of a flat back.

Arrows in FIG. 11 denote the flow of lubricating oil which occurs when the chain travels in sliding contact with a chain guide. In FIG. 11 the back surfaces 211b of the inner plates 211 and the back surfaces 212b of the guide plate 212, having high back surfaces are shaded.

In the silent chain 200, because the high backs are formed by convex, arc-shaped, back surfaces, the contact area between the chain guide and the back surface of the chain can be significantly reduced. Thus, smoother travel of the chain while in sliding contact with the chain guide can be attained, and friction loss can be significantly reduced. And at the same time, since the convex plate back surfaces 211b catch lubricating oil between the sliding contact surfaces of the chain guide and the chain, superior wear resistance can be exhibited.

What is claimed is:

1. A silent chain comprising widthwise rows of link plates interleaved with one another and connected articulably by connecting pins to form an endless loop, at least some of the link plates of the chain having teeth protruding toward the inside of the loop for engagement with sprocket teeth, the chain having an outwardly facing side capable of sliding contact with a chain guide, and the link plates having back surfaces facing toward the outside of the loop, wherein the link plates of the chain comprise first and second sets of link plates, the backs of the plates of the first set protruding toward the outside of the loop farther than the backs of the link plates of the second set, the plates of the first set being arranged in repeating groups, each group extending across the width of the chain, the groups being longitudinally spaced from one another along the length of the chain, adjacent link plates of each said group being in contact with each other, and the plates of each said group being offset longitudinally to form a V-shaped oil guide wall on the outwardly facing side of the chain, the V-shaped guide walls defining V-shaped, oil-retaining recesses on the outwardly facing side of the chain, each said recess having open ends on opposite sides of the chain.

2. A silent chain according to claim 1, wherein said V-shaped guide walls are repeated at regular intervals, each said interval being a integral multiple of the chain pitch.

3. A silent chain according to claim 1, wherein the backs of the plates of the first set are in the form of convex arcs bulging toward the outside of the loop.

4. A silent chain according to claim 3, wherein said V-shaped guide walls are repeated at regular intervals, each said interval being a integral multiple of the chain pitch.

5. A silent chain transmission comprising a chain according to claim 1, wherein the chain is arranged to move in a circulating path in a traveling direction, and wherein each of said V-shaped oil-retaining recesses comprises two parts extending obliquely forward in the direction of travel of the chain from an apex at an intermediate location between said opposite sides of the chain.

6. A silent chain transmission according to claim 5, wherein said V-shaped guide walls are repeated at regular intervals, each said interval being a integral multiple of the chain pitch.

7. A silent chain transmission according to claim 5, wherein the backs of the plates of the first set are in the form of convex arcs bulging toward the outside of the loop.

8. A silent chain transmission according to claim 7, wherein said V-shaped guide walls are repeated at regular intervals, each said interval being a integral multiple of the chain pitch.

9. A silent chain transmission according to claim 5, including a chain guide with which said outwardly facing side of the chain is in sliding contact.

10. A silent chain transmission according to claim 9, wherein said V-shaped guide walls are repeated at regular intervals, each said interval being a integral multiple of the chain pitch.

11. A silent chain transmission according to claim 9, wherein the backs of the plates of the first set are in the form of convex arcs bulging toward the outside of the loop.

12. A silent chain transmission according to claim 11, wherein said V-shaped guide walls are repeated at regular intervals, each said interval being a integral multiple of the chain pitch.

13. A silent chain comprising widthwise rows of link plates interleaved with one another and connected articulably by connecting pins to form an endless loop, at least some of the link plates of the chain having teeth protruding toward the inside of the loop for engagement with sprocket teeth, the chain having an outwardly facing side capable of sliding contact with a chain guide, and the link plates having back surfaces facing toward the outside of the loop, wherein the link plates of the chain comprise first and second sets of link plates, the backs of the plates of the first set protruding toward the outside of the loop farther than the backs of the link plates of the second set, the plates of the first set being arranged in repeating groups, each group extending across the width of the chain and comprising at least one link plate located at an intermediate location between opposite sides of the chain and plural link plates on each side of said at least one link plate, the groups being longitudinally spaced from one another along the length of the chain, and the plates of each said group being offset longitudinally to form a V-shaped oil guide wall on the outwardly facing side of the chain, the V-shaped guide walls defining V-shaped, oil-retaining recesses on the outwardly facing side of the chain, each said recess having open ends on opposite sides of the chain.

14. A silent chain according to claim 13, in which adjacent link plates of each said group are in contact with each other.

15. A silent chain transmission comprising a chain according to claim 13, wherein the chain is arranged to move in a circulating path in a traveling direction, and wherein each of said V-shaped oil-retaining recesses comprises two parts extending obliquely forward in the direction of travel of the chain from an apex at an intermediate location between said opposite sides of the chain.

16. A silent chain transmission according to claim 15, including a chain guide with which said outwardly facing side of the chain is in sliding contact.

* * * * *